United States Patent [19]

Evans et al.

[11] 4,044,194
[45] * Aug. 23, 1977

[54] ELECTRIC BATTERIES

[75] Inventors: Leslie Samuel Evans, Upper Basildon; John Richard Harbar, Grove, near Wantage, both of England

[73] Assignee: Secretary of State for Industry in Her Britannic Majesty's Government of the United Kingdon of Great Britain and Northern Ireland, United Kingdom

[*] Notice: The portion of the term of this patent subsequent to Jan. 13, 1993, has been disclaimed.

[21] Appl. No.: 591,322

[22] Filed: June 30, 1975

[51] Int. Cl.² .............................................. H01M 4/36
[52] U.S. Cl. ................................ 429/104; 429/218
[58] Field of Search ............... 136/10, 6 F, 6 FS, 20, 136/83 T; 429/104, 105, 191, 218

[56] References Cited

U.S. PATENT DOCUMENTS

| | | | |
|---|---|---|---|
| 3,167,456 | 1/1965 | Schilke et al. | 136/10 |
| 3,488,220 | 1/1970 | Lyall et al. | 136/10 |
| 3,488,221 | 1/1970 | Shimotake et al. | 136/6 FS X |
| 3,679,480 | 7/1972 | Brown et al. | 136/6 FS |
| 3,770,502 | 11/1973 | Nakabayashi | 136/6 FS |
| 3,837,918 | 9/1974 | Nakabayashi | 136/6 FS |
| 3,841,912 | 10/1974 | Kagawa et al. | 136/6 FS |
| 3,932,195 | 1/1976 | Evans et al. | 429/104 |

Primary Examiner—C. F. LeFevour
Attorney, Agent, or Firm—Larson, Taylor and Hinds

[57] ABSTRACT

The invention comprises an electric battery of the kind for use with a liquid anode, a liquid cathode and a solid electrolyte, and having a number of cells nested one within the other such that adjacent cells share and are separated by a common electrode.

The common electrode may provide a series connection or a parallel connection between adjacent cells.

9 Claims, 4 Drawing Figures

ELECTRIC BATTERIES

BACKGROUND TO THE INVENTION

This invention relates to batteries formed from electric cells of the kind for use with a liquid anode, and a liquid cathode, and having a solid electrolyte of tubular or the like form with a closed end, and a current collecting means, such batteries being hereinafter referred to as "the kind described". One such cell is described in our copending patent application Ser. No. 556,500 now U.S. Pat. No. 3,982,959.

SUMMARY OF THE INVENTION

According to the present invention, a battery comprises a plurality of electric cells of the kind described nested one within the other such that adjacent cells share and are separated by a common electrode.

In one aspect of the present invention, the common electrode provides a series connection between the electric cells, and is hereinafter referred to as a bipolar electrode.

In another aspect of the present invention, the common electrode enables a parallel connection of the electric cells, and is hereinafter referred to as a terminal electrode.

BRIEF EXPLANATION OF THE DRAWINGS

Batteries of four forms in accordance with the invention, incorporating electric cells of the kind described, will now be described by way of example only and with reference to the accompanying drawings, in which.

DETAILED DESCRIPTION OF THE INVENTION

Figure 1:
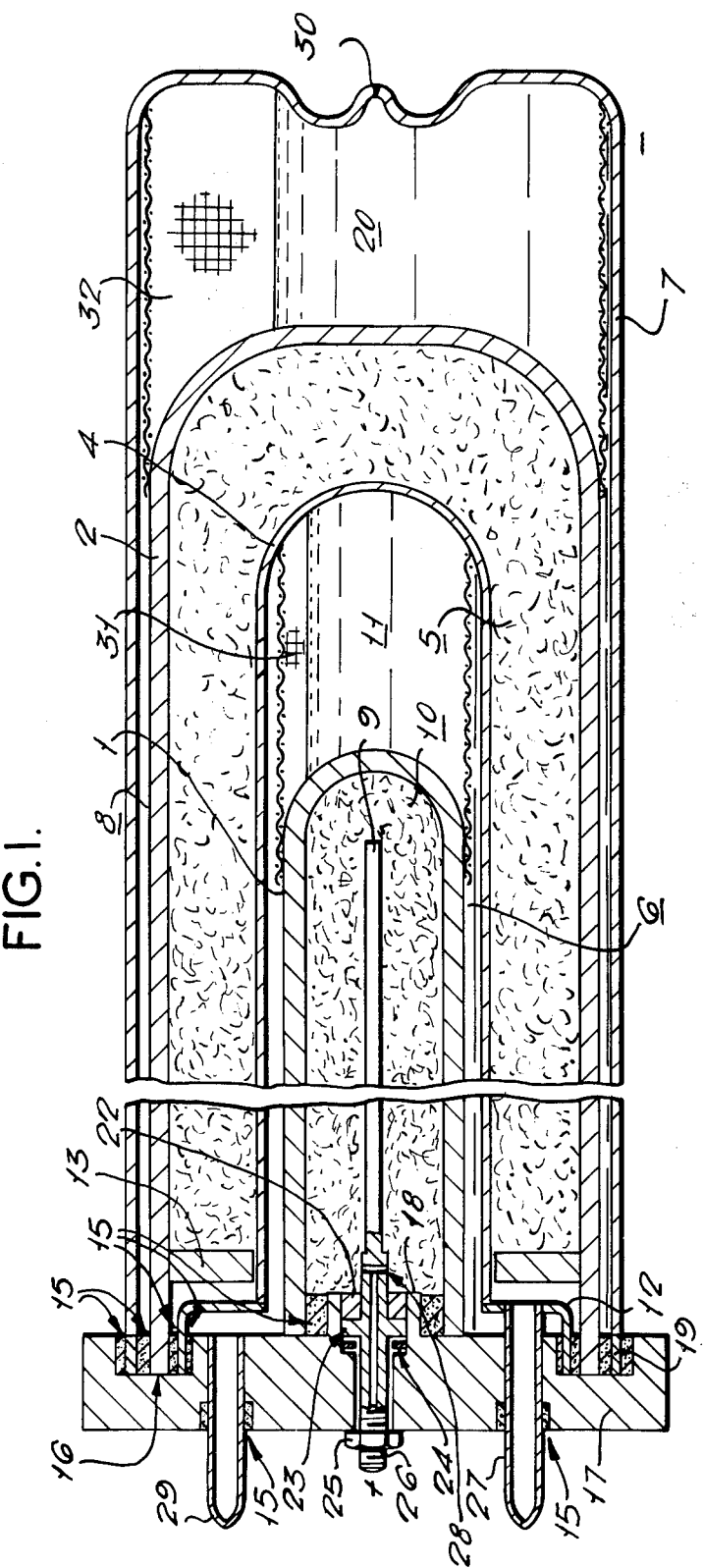
FIG. 1 is an axial sectional view of a battery having two electric cells separated by a bipolar electrode.

Referring now to FIG. 1, the battery shown is of circular form in section and comprises an inner tubular β-alumina solid electrolyte 1 disposed lengthwise and substantially concentrically within an outer tubular β-alumina solid electrolyte 2 to define a space therebetween in which a stainless steel (for example AISI 316) tubular bipolar electrode 4 is disposed lengthwise and substantially concentrically to define sub-spaces 5 and 6. The outer solid electrolyte 2 is disposed lengthwise and substantially concentrically within a tubular metal casing 7, mainly of low alloy steel, to define a tubular space or gap 8 between the solid electrolyte 2 and the casing 7. The inner solid electrolyte 1, the outer solid electrolyte 2, the bipolar electrode 4, and the casing 7, are all closed at one end. A molybdenum current collecting rod 9 extends lengthwise and substantially concentrically into the space 10 inside the inner solid electrolyte 1. The battery is shown with its longitudinal axis disposed in a horizontal position but can operate in a vertical or intermediate position as well.

Liquid sodium is disposed in the sub-space 6 and the space 8. Graphite felt partially impregnated with liquid sulphur is disposed in the sub-space 5 and the space 10, thereby providing a suitable distributed voidage within the graphite felt to allow for expansion caused by the formation of polysulphides from the combination of sodium ions and sulphur when the battery discharges. The graphite felt also acts as a wick to constrain the liquid sulphur to "wet" the surfaces of the inner and outer solid electrolytes 1 and 2. The lengths of the inner solid electrolyte 1, the bipolar electrode 4, the outer solid electrolyte 2, and the casing 7, are such as to leave spaces 11 and 20 to act as reservoirs for liquid sodium. Stainless steel wire mesh wicks 31 and 32 in the spaces 11 and 20 constrain the liquid sodium to "wet" the ends of the solid electrolytes 1 and 2 by capillary action. The radial gaps between the inner solid electrolyte 1 and the bipolar electrode 4, and between the outer solid electrolyte 2 and the casing 7, are such as to constrain the liquid sodium by capillary action to "wet" the surfaces of the inner solid electrolyte 1 and the outer solid electrolyte 2, although the said gaps are shown as wide gaps in FIG. 1 for clarity.

In greater detail, the bipolar electrode 4 has a shouldered cylindrical portion 12 of "Kovar" nickel/iron alloy at its open end, butt-welded to the main portion of the said electrode 4, which locates inside the outer solid electrolyte 2. The graphite felt in the sub-space 5 is capped with a loose fitting α-alumina annular plug-like spacer 13. The casing 7 at its open end has a short portion of "Kovar" nickel/iron alloy which is butt-welded to the main low alloy portion of the said casing 7. The portion 19, the solid electrolyte 2, and the bipolar electrode 4, are all located within an annular groove 16 in an end plate 17 of insulating material, for example α-alumina, and are sealed thereto, and therebetween each other, with glass frit seals 15. The inner solid electrolyte 1 locates onto a spigot 18, which projects from the plate 17, and is sealed thereto with a glass frit seal 15. The graphite felt inside the space 10 in solid electrolyte 1 is capped with an α-alumina annular spacer 22 which butts against one side of a flanged portion 23 of the rod 9. A "Grafoil" gasket 24 between the other side of the flanged portion 23 and the end plate 17 is compressed by a nut 25 on the threaded end 26 of the rod 9.

A "Kovar" nickel/iron alloy filling tube 27 projecting from the shouldered portion 12 of the bipolar electrode 4, and a "Kovar" nickel/iron alloy filling tube 29, extend through the end plate 17 and are sealed thereto by glass frit seals 15. A hole extends through the threaded end 26 of the rod 9 and leads to a transverse hole 28 within the space 10. The filling tube 29 terminates flush with the inside face of the end plate 17 at a position adjacent to the shouldered portion 12 of the bipolar electrode 4. A short tube 30 is recessed into the closed end of the casing 7. The tube 27, and the hole in the threaded end 26 are used to feed liquid sulphur into the sub-space 5 and the space 10 respectively. The tube 29 and the short tube 30 are used to feed liquid sodium into the sub-space 6 and the space 8. When the battery has been filled with liquid sulphur and liquid sodium, the said tubes 27, 29 and 30, and the threaded end 26 are sealed by crimping and welding. A negative terminal (not shown) is welded to the side of the casing 7, the positive terminal being provided by the threaded end 26.

The bipolar electrode 4 in effect separates two electric cells of the kind described and acts as a series connection between them. In operation, each of the said electric cells develops a potential difference, and because of the series connection provided by the bipolar electrode 4, the total potential difference developed across the battery will be equal to the sum of the said potential difference of each cell.

The invention has been described in FIG. 1 in relation to a battery in which the surface area of solid electrolyte in the inner cell of a nest of cells is less than that of the outer cell but it may be increased so that it is similar in value to that of the outer cell. For example, the single inner tubular solid electrolyte 1 may be dispensed with and a plurality of smaller diameter inner tubular solid electrolytes used, each having a current collecting means 9 disposed within it, and joined to the end plate 17 in a similar way to that shown in relation to the inner tubular solid electrolyte 1, the threaded ends 26 subsequently being joined in parallel. By optimizing the design of the battery, the outer and inner cells may be arranged so that they are similar in surface area of solid electrolyte and volume of liquid sulphur, thereby equalizing the power and energy levels in each cell.

Figure 2:
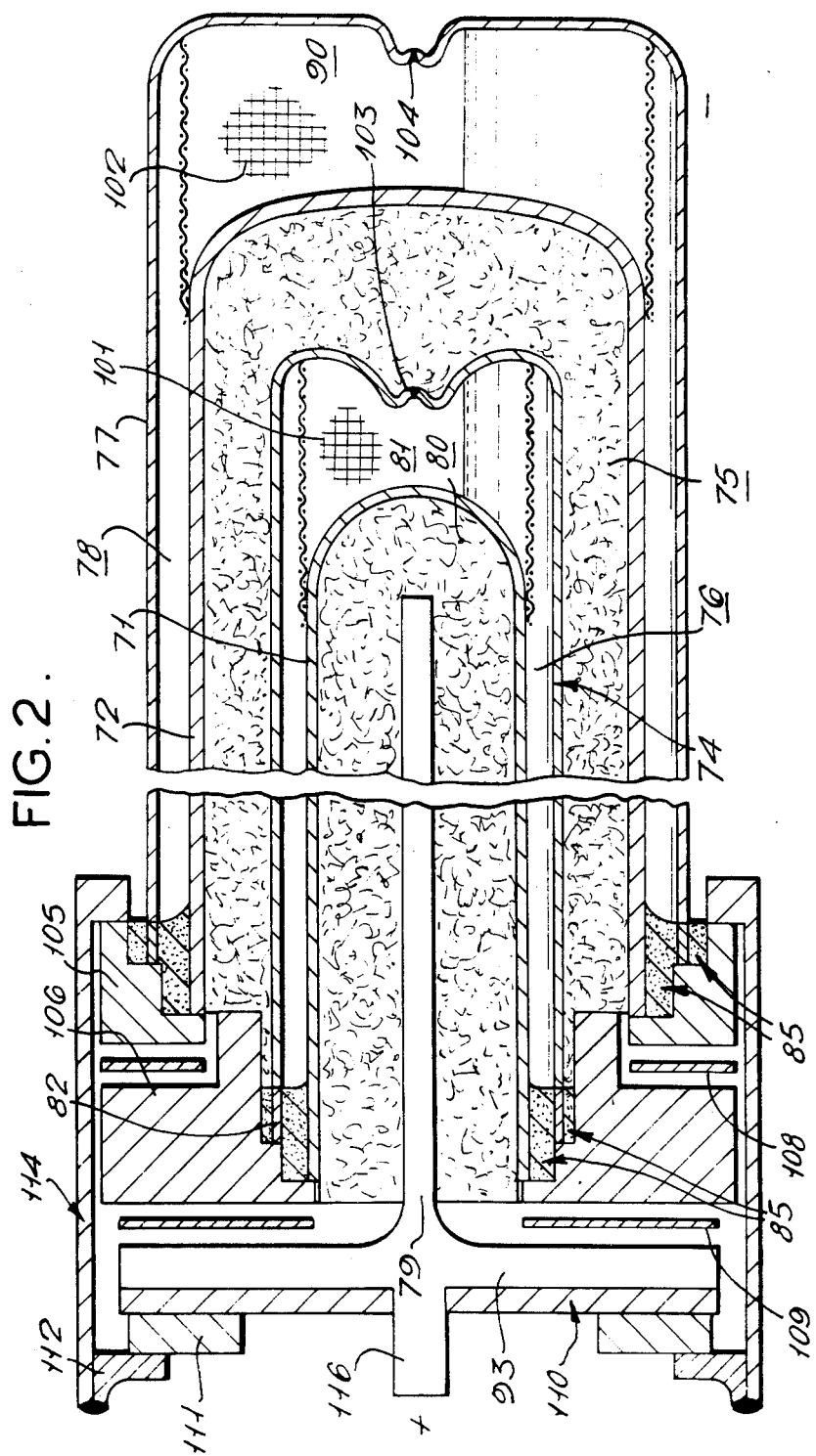
FIG. 2 is an axial sectional view of an alternative battery to that shown in FIG. 1.

Referring now to FIG. 2, the battery shown is of circular form in section, and generally follows the design principles and uses the same materials as the battery shown in FIG. 1, but dispenses with the external filling tubes in the α-alumina end plate, thereby providing a "cleaner" external appearance requiring less space and less liable to damage, and hence leakage, of the liquid anode and the liquid cathode.

The disposition of the β-alumina inner and outer tubular solid electrolytes 71 and 72 in relation to the stainless steel bipolar electrode 74 and the mainly low alloy steel casing 77 to define sub-spaces 75 and 76, and a space 78, is substantially the same as the arrangement shown in FIG. 1, and as in FIG. 1, a plurality of inner tubular solid electrolytes may be used instead of the single inner tubular solid electrolyte 71 shown. Reservoirs 81 and 90 are provided for liquid sodium with stainless steel wicks 101 and 102. Liquid sodium is disposed in the sub-space 76, the space 78, and the reservoirs 81 and 90, whilst graphite felt partially impregnated with liquid sulphur is disposed in the sub-space 75 and the space 80 inside the inner solid electrolyte 71.

The "Kovar" nickel/iron alloy shouldered portion of the bipolar electrode 4 of FIG. 1 is omitted from the bipolar electrode 74, which instead has a "Kovar" nickel/iron alloy cylindrical extension 82 butt-welded to the main portion of the said electrode 74. A molybdenum current collecting rod 79 with a relatively large flange 93 extends lengthwise and substantially concentrically into the space 80. Filling inlets 103 and 104 are provided for feeding liquid sodium into the reservoirs 81 and 90 respectively.

Since a high temperature of the order of 1000° C is needed to form the glass frit seals 85, the said seals 85 are made before the liquid sodium, or the graphite felt and liquid sulphur are added to the battery. It is this feature which necessitates a different method of incorporating the components together than that shown in FIG. 1 because of the absence of most of the external filling tubes.

The battery shown in FIG. 2 can be considered as being formed of three sub-assemblies. The first sub-assembly is formed by the casing 77, the outer solid electrolyte 72, and an outer α-alumina collar 105, the said casing 77 and outer solid electrolyte 72 being located in circular recesses in the said collar 105, and sealed thereto and therebetween each other with glass frit seals 85. Liquid sodium is then fed through the filling tube 104 which is finally crimped and welded.

The second sub-assembly is formed by the bipolar electrode 74, the inner solid electrolyte 71, and an intermediate α-alumina collar 106, the said bipolar electrode 74 and the inner solid electrolyte 71 being located in circular recesses in the said collar 106 and sealed thereto and therebetween each other with glass frit seals 85. Liquid sodium is fed through the feed tube 103, after which the said tube is crimped and welded. Graphite felt rings are disposed on the outside of the bipolar electrode 74, and partially impregnated with liquid sulphur in a mould having substantially the same internal dimensions as the outer solid electrolyte 72.

The third sub-assembly is formed by the rod 79 on which graphite felt rings are disposed. The graphite felt is partially impregnated with liquid sulphur in a mould having substantially the same internal dimensions as the inner solid electrolyte 71.

The final assembled form of the battery as shown in FIG. 2 is made by combining the first and second sub-assemblies with the rod 79 (shown spaced apart for clarity) in an inert atmosphere at ambient temperature, using Grafoil gaskets 108 and 109, a stainless steel expansion compensating disc 110, and an α-alumina insulating collar 111, the assembly being clamped together with a low alloy steel end ring 112 edge-welded to an outer low alloy steel clamping sleeve 114.

Although the batteries shown in FIG. 1 and FIG. 2 have been described in relation to the use of liquid sodium and liquid sulphur, other alternative liquid anode and liquid cathode materials may be used with appropriate solid electrolytes. Instead of the casing being made mainly from low alloy steel with a "Kovar" extension it may be made from some other material, such as stainless steel to suit the operating temperature of the cell and the materials used as the liquid anode and the liquid cathode. The "Kovar" nickel/iron alloy portion is provided to permit glass frit seals to be used since it has a controlled expansion, but this may be dispensed with if alternative sealing arrangements are used. In order to protect the "Kovar" nickel/iron alloy portions from any corrosive effect from the cathodic reactions between the liquid sodium and the liquid sulphur, the α-alumina spacers are used to keep the graphite felt away from the said portions so that no cathodic reactions can take place near them. If thought necessary a seal may be introduced around the spacers to prevent sulphur vapour from reaching the "Kovar" portions. Similar considerations apply to the choice of material for the rod 9, and an alternative material such as graphite may be used. In view of the corrosive nature of the electro-chemical reaction within the liquid cathode, it will usually be desirable to use a corrosion resistant conductor as the bipolar electrode, although this need not necessarily be of stainless steel.

The arrangement shown in FIG. 1 relies on capillary action to constrain the liquid sodium to "wet" the cylindrical surfaces of the solid electrolytes. As an alternative, wicks (not shown), may be disposed for example in the sub-space 6 and the space 8, contiguous to the inner and outer solid electrolytes 1 and 2 and in electrical contact with the bipolar electrode 4 and the casing 7, for the same purpose. In such a battery, the sub-space 6 and the space 8 may be of larger radial annular dimension to provide additional storage space for the liquid sodium, allowing the spaces 11 and 12 to be much reduced in volume or dispensed with substantially altogether. Similar considerations apply to the battery described in relation to FIG. 2.

The invention is not restricted to batteries having a circular form in section, and non-circular section configurations, such as a square, may be used to suit the space provided in a particular installation for housing the battery. The invention is not restricted to batteries formed only from two cells separated by a bipolar electrode, and a plurality of cells separated by a plurality of bipolar electrodes may be formed as shown for example diagrammatically in FIG. 3.

Figure 3:
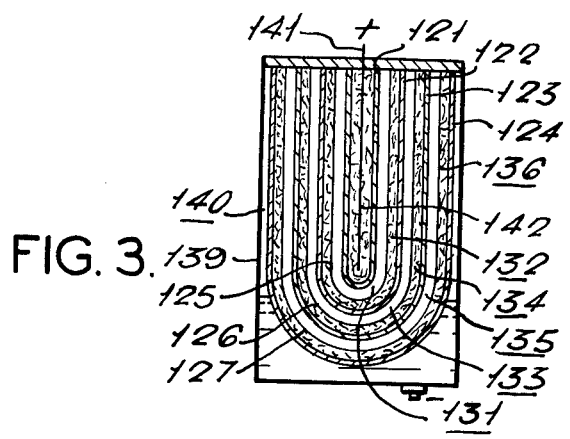
FIG. 3 is a diagrammatic axial sectional view of a battery having four electric cells separated by bipolar electrodes.

Referring now to FIG. 3, the battery essentially follows the design principles and uses the same materials, as the batteries described in relation to FIGS. 1 and 2. It uses the aforesaid alternative method of providing storage space for liquid sodium within an enlarged annular space and sub-spaces, and also uses stainless steel wicks (not shown) to constrain the liquid sodium to "wet" the surfaces of the solid electrolytes. The battery comprises four β-alumina solid electrolyte tubes 121, 122, 123 and 124, and three stainless steel (for example AISI 316) bipolar electrodes 125, 126 and 127, with "Kovar" nickel/iron alloy extensions, all of which are disposed alternately one within the other, and in such a manner that each bipolar electrode is between two solid electrolyte tubes to define sub-spaces 131, 132, 133, 134, 135 and 136 therebetween. The outer solid electrolyte tube 124 is disposed within a mainly low alloy steel casing 139 to define a space 140 therein. A molybdenum current collecting rod 141 is disposed lengthwise within the inside space 142 of the inner solid electrolyte tube 121. Graphite felt partially impregnated with liquid sulphur is disposed within the sub-spaces 132, 134 and 136 and the space 142. Liquid sodium is disposed in the sub-spaces 131, 133, 135 and the space 140. Stainless steel wicks (not shown) are disposed in the sub-spaces 131, 133, 135 and the space 140.

In effect the battery shown in FIG. 3 comprises four electric cells of the kind described separated by bipolar electrodes which act as series connections between the cells. The battery operates in a similar manner to the batteries described hereinbefore in relation to FIG. 1 and FIG. 2. The potential difference across the battery will be equal to the sum of the potential difference of the said cells.

The invention has been described by way of example in FIGS. 1, 2 and 3, in relation to electric cells in which a space for the liquid anode partially surrounds an inner space for the liquid cathode. Naturally the invention is also applicable to electric cells in which the relative position of the liquid anode and the liquid cathode is reversed.

Figure 4:
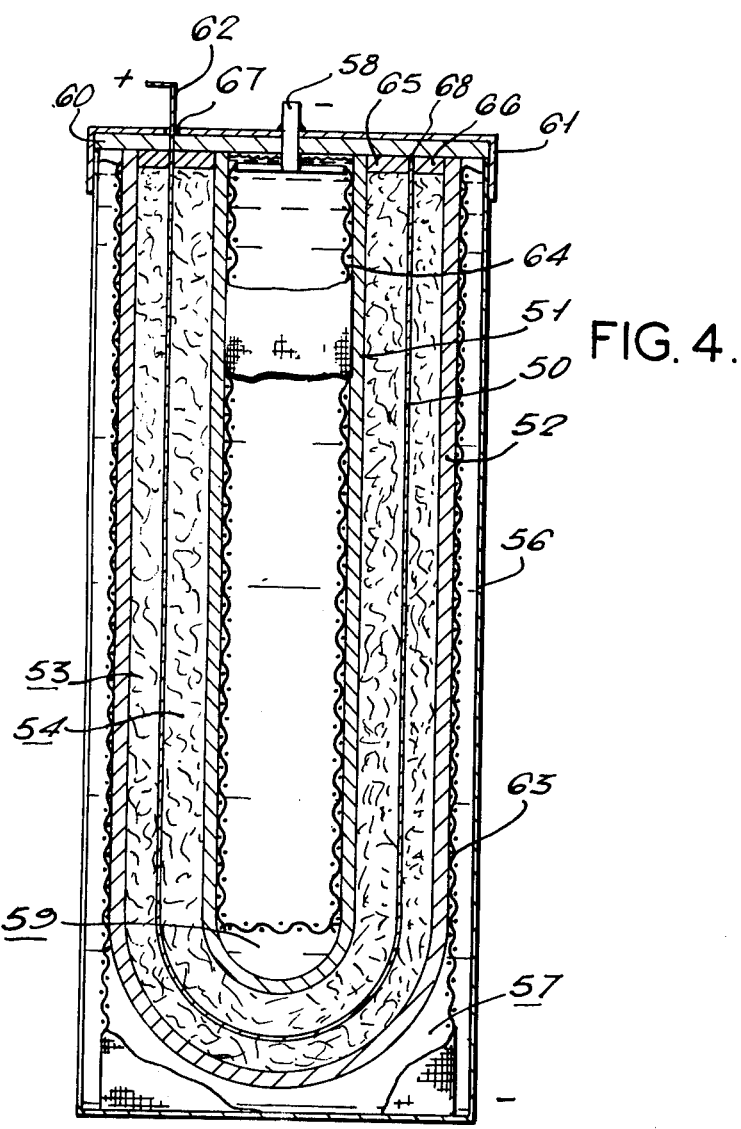
FIG. 4 is a diagrammatic axial sectional view of a battery having two electric cells separated by a terminal electrode.

Referring now to FIG. 4, the battery shown is of circular form in section, and generally follows the design principles, and uses the same materials as the battery shown in FIG. 3, in that it uses stainless steel wicks to constrain the liquid sodium to "wet" the surfaces of the solid electrolytes.

A stainless steel (for example AISI 316) tubular terminal electrode 50 with a "Kovar" nickel/iron alloy extension 68, is disposed between an inner tubular solid electrolyte 51 of β-alumina and an outer tubular solid electrolyte 52, also of β-alumina, to define sub-spaces 53 and 54 within which graphite felt partially impregnated with liquid sulphur is disposed, liquid sodium being disposed in the space 59 inside the inner solid electrolyte 51. The graphite felt in the sub-spaces 53 and 54 is capped with α-alumina spacers 65 and 66. The outer solid electrolyte 52 is disposed within a tubular mainly low alloy steel casing 56 to define a space 57 therebetween for liquid sodium. A stainless steel wick 63 is disposed in the space 57 contiguous to the outer solid electrolyte 52. A stainless steel wick 64 extends in the space 59 contiguous to the inside face of the inner solid electrolyte 51 and also acts as the negative electrode being connected to a "Kovar" nickel/iron alloy rod 58 which projects through an α-alumina disc 60 to provide a negative terminal 58. The rod 58, and the casing 56 which provides another negative terminal, are welded to a low alloy steel end cap 61. A projection 62 from the "Kovar" nickel/iron alloy extension 68, projecting through the disc 60, and the end cap 61, and insulated from the cap 61 by an insulating sleeve 67, provides the positive terminal. In effect the terminal electrode 50 separates two electric cells of the kind described, and provides a parallel connection between them so that the current produced by the battery will be the sum of the currents produced by each electric cell.

The arrangements shown in FIG. 4 may be reversed, so that liquid sodium is disposed in the sub-spaces 53 and 54, and graphite felt partially impregnated with liquid sulphur 55 is disposed in the spaces 57 and 59, appropriate changes being made in the materials used. For example the casing 56 would have to be made of AISI 316 stainless steel, to resist the corrosive effect of the electro-chemical reactions taking place between the liquid sulphur and the liquid sodium. The rod 58 and the casing 56 would form positive terminals, and the common electrode 50 form the negative terminal in the said reversed arrangement.

Naturally as in the case of the batteries described in relation to FIGS. 1, 2 and 3, alternative liquid anode and liquid cathode materials, with appropriate solid electrolytes, may be used in the battery described in relation to FIG. 4, and similar considerations also apply to the choice of material for the casing 56, the rod 58, the terminal electrode 50, and the end cap 61.

A plurality of electric cells, some of which are separated by bipolar electrodes, and the others are separated by terminal electrodes, may be nested one with the other to form a battery.

It will be appreciated that the invention includes an electric battery having a plurality of electric cells of the kind described nested one within the other, and also includes a method of assembling such cells. Two adjacent electric cells may share a common electrode.

We claim:

1. An electric battery having at least two electric cells, each said cell having a solid electrolyte with liquid sodium on one side and liquid sulphur on the other side, as the cell reactants, the improvement wherein the solid electrolytes are of tubular form enclosed at one end and disposed substantially concentrically one within the other and said battery further comprises common electrode means of tubular form closed at one end and disposed substantially concentrically between adjacent solid electrolytes so as to electrically connect the adjacent cells and at least in part separate the cell reactants in said adjacent cells.

2. An electric battery having at least two electric cells, each cell having a solid electrolyte bounding in part on one side a compartment containing liquid sodium and on the other side a compartment containing liquid sulphur as the cell reactants, wherein the improvement comprises each cell having a tubular solid electrolyte closed at one end, the solid electrolytes and thereby each cell being disposed substantially concentrically one within the other, and tubular common electrode means closed at one end and disposed substantially concentrically between adjacent solid electrolytes so as to define sub-spaces therebetween, the disposition of the cell reactants being such that liquid solium is contained in one of the sub-spaces and liquid sulphur in the other said sub-space, said battery further comprising a ceramic member arranged to support said common electrode means so that said common electrode means provides a bipolar electrode and thereby a series connection between said adjacent cells.

3. A battery as claimed in claim 2, wherein the cells are adapted so that they have similar power and energy levels.

4. A battery having at least two electric cells with liquid sodium and liquid sulphur as cell reactants, which cells each comprise an outer tubular metal casing with a closed end which also provides one electrode means for the cell, a tubular solid electrolyte with a closed end disposed within the casing to define an outer space therebetween containing one of the cell reactants, an inner space containing the other cell reactant being provided within the tubular solid electrolyte, and another electrode means disposed and extending within the inner space, the cells being disposed substantially concentrically one within the other and being so shaped that the outer casing of one cell provides at least in part the another electrode means of the other adjacent cell and thereby provides a common electrode means between the solid electrolytes of the one and the other cells, and electrical insulating means for mechanically supporting the common electrode means at the open end thereof relative to the solid electrolytes so that in operation the common electrode means provides a bipolar electrode and thereby a series connection between said one cell and said other cell.

5. A battery as claimed in claim 4, wherein the solid electrolytes are of similar surface area, and the spaces to be occupied by liquid cathode are of similar volume.

6. A battery as claimed in claim 4, wherein ceramic plug-like members are disposed in the spaces to be occupied by liquid cathode to provide regions substantially free from cathodic reactions.

7. A battery as claimed in claim 4, wherein ceramic and metallic parts are joined together by glass sealing means.

8. A battery as claimed in claim 4, wherein a ceramic end cap closes the open ends of the casings and solid electrolytes of the cells forming the battery and is joined to the casings and solid electrolytes by glass sealing means.

9. A battery as claimed in claim 8 wherein metallic filling tubes are joined to the end cap by glass sealing means to provide flow therethrough to the outer and inner spaces, the tubes being sealed by sealing means after filling of the battery with cell reactants.

* * * * *